United States Patent
Pedersen

(10) Patent No.: US 6,371,541 B1
(45) Date of Patent: Apr. 16, 2002

(54) ENERGY ABSORBING DEVICE

(75) Inventor: Roald Helland Pedersen, Gjøvik (NO)

(73) Assignee: Norsk Hydro Asa, Oslo (NO)

( * ) Notice: Subject to any disclaimer, the term of this patent is extended or adjusted under 35 U.S.C. 154(b) by 0 days.

(21) Appl. No.: 09/700,864

(22) PCT Filed: May 12, 1999

(86) PCT No.: PCT/NO99/00155

§ 371 Date: Nov. 20, 2000

§ 102(e) Date: Nov. 20, 2000

(87) PCT Pub. No.: WO99/59842

PCT Pub. Date: Nov. 25, 1999

(30) Foreign Application Priority Data

May 18, 1998 (NO) .......................................... 1998 2268

(51) Int. Cl.[7] .......................... B60R 19/34; B60R 19/26
(52) U.S. Cl. ...................... 293/132; 293/133; 293/155; 296/189
(58) Field of Search ................................. 296/189, 155; 293/132, 133, 155; 188/371, 377

(56) References Cited

U.S. PATENT DOCUMENTS

| | | | | |
|---|---|---|---|---|
| 3,747,969 A | * | 7/1973 | Diener | 293/133 |
| 3,759,351 A | * | 9/1973 | Purple | 188/377 |
| 3,779,591 A | * | 12/1973 | Rands | 293/133 |
| 3,794,367 A | * | 2/1974 | Slessor | 293/136 |
| 3,893,726 A | | 7/1975 | Strohschein | |
| 3,955,640 A | * | 5/1976 | Yamanaka | 180/271 |
| 4,823,923 A | * | 4/1989 | Moyer | 188/376 |
| 5,605,353 A | * | 2/1997 | Moss et al. | 280/784 |
| 6,050,624 A | * | 4/2000 | Kim | 293/132 |

FOREIGN PATENT DOCUMENTS

| | | | | |
|---|---|---|---|---|
| DE | 1680029 | * | 8/1971 | 293/133 |
| DE | 1630860 | | 10/1971 | |
| EP | 0556667 A1 | | 8/1993 | |
| EP | 0903265 A2 | | 3/1999 | |
| FR | 2528928 | | 12/1983 | |
| FR | 2729198 | | 7/1996 | |
| JP | 60-121147 | | 6/1985 | |
| WO | 97/47495 | | 12/1997 | |

* cited by examiner

Primary Examiner—Stephen T. Gordon
Assistant Examiner—Gregory A. Blankenship
(74) Attorney, Agent, or Firm—Wenderoth, Lind & Ponack, L.L.P.

(57) ABSTRACT

An energy absorbing device, for use in a vehicle to absorb impact energy, includes an attachment bracket for fastening a bumper member to a vehicle frame. The bracket includes at least two energy absorbing walls that have apertures to accommodate bolts. Upon a collision, the bolts shear the bracket walls along cutting lines.

22 Claims, 4 Drawing Sheets

ENERGY ABSORBING DEVICE

BACKGROUND OF THE INVENTION

The present invention relates to an energy absorbing device, and more particularly to an energy absorbing device in a (motor) vehicle bumper system to absorb impact energy originating from a car accident.

Customarily, there are several different requirements for optimally-functioning bumper systems in vehicles. Presently the car manufactures operate with three levels of impact—low up to 4–8 km/h, intermediate from 4–8 to 16 km/h and finally impacts at a speed exceeding 16 km/h.

Normally, the impact at the low and the intermediate speeds is taken care of by the bumper member itself and a reversible or non-reversible energy absorbing element, usually located between the bumper member and extending to or into the longitudinal members of the vehicle. The impact energy of a collision at a speed over 16 km/h will finally mostly be absorbed by deformation of one or more front/rear side members of the vehicle frame.

The energy absorbing elements may be a thin-walled folding member which can be filled with foam or other resilient material. The drawback of filling the member is that it is then not totally compressible due to the solid block being made. Furthermore, it also has the drawback of having a varying force over the displacement due to the varying resistance when making folds.

Other design principles commonly used are: absorbing energy by inverting a tube wall; absorbing energy by means of pressing a tube through a restriction, thus reducing the tube diameter; pressing a fluid or a wax through apertures in a cylinder or a piston, typical in a reversible system; and expanding the diameter of a tube by forcing a substantially solid member through the tube. These solutions often have the drawback of having to provide a flange for attachment to the side member.

It is known that these folding members—customarily based on relatively small diameter tubes—may be unstable and tend to bend out when subjected to an impact load that is not co-axial with the member or arising at an angle to the member. This is important since it is well known that a large portion of front and rear vehicle impacts arise at an angle to the vehicle's longitudinal axis and thus result in non-axial loads. It is also known that many of these members lock solid when subjected to a non-axial load or a load arising at an angle to the member.

Furthermore, from JP 60121147 it is known to absorb impact energy by a special design of a bumper-attaching member comprising several elongated holes having a width smaller than the diameter of fastening members (bolts) extending through the holes. Upon a moderate speed crash of the vehicle, the received impact force will be transferred via the fastening bolts into the edges of the holes. The impact energy will then be absorbed by widening of the holes due to successive movement of the bolts along the holes. The shortcomings of this solution are apparently the limited amount of energy that can be absorbed by a simple deformation/enlarging of the holes. A possible compensation for this drawback requires a substantial increase of the wall thickness of the attaching member and, thus, increase in weight and costs of the device, effecting negatively both performance and price for the vehicle.

SUMMARY OF THE INVENTION

Consequently, it is an object of the present invention to provide a novel low weight energy absorbing device that exhibits substantially improved absorption of impact energy. Another object of the invention is to provide a low cost and easily assembled energy absorbing device. Still another object of the invention is to provide an energy absorbing device with no limits regarding the applied material improving the total strength of the bumper beam (system).

These and other objects of the present invention are achieved by the energy absorbing device as described and defined below, including the preferred embodiments of the device.

BRIEF DESCRIPTION OF THE DRAWINGS

The invention will now be described in detail by way of examples of preferred embodiments of the energy absorbing device with reference to the attached drawings, wherein.

DETAILED DESCRIPTION OF THE INVENTION

Figure 1:
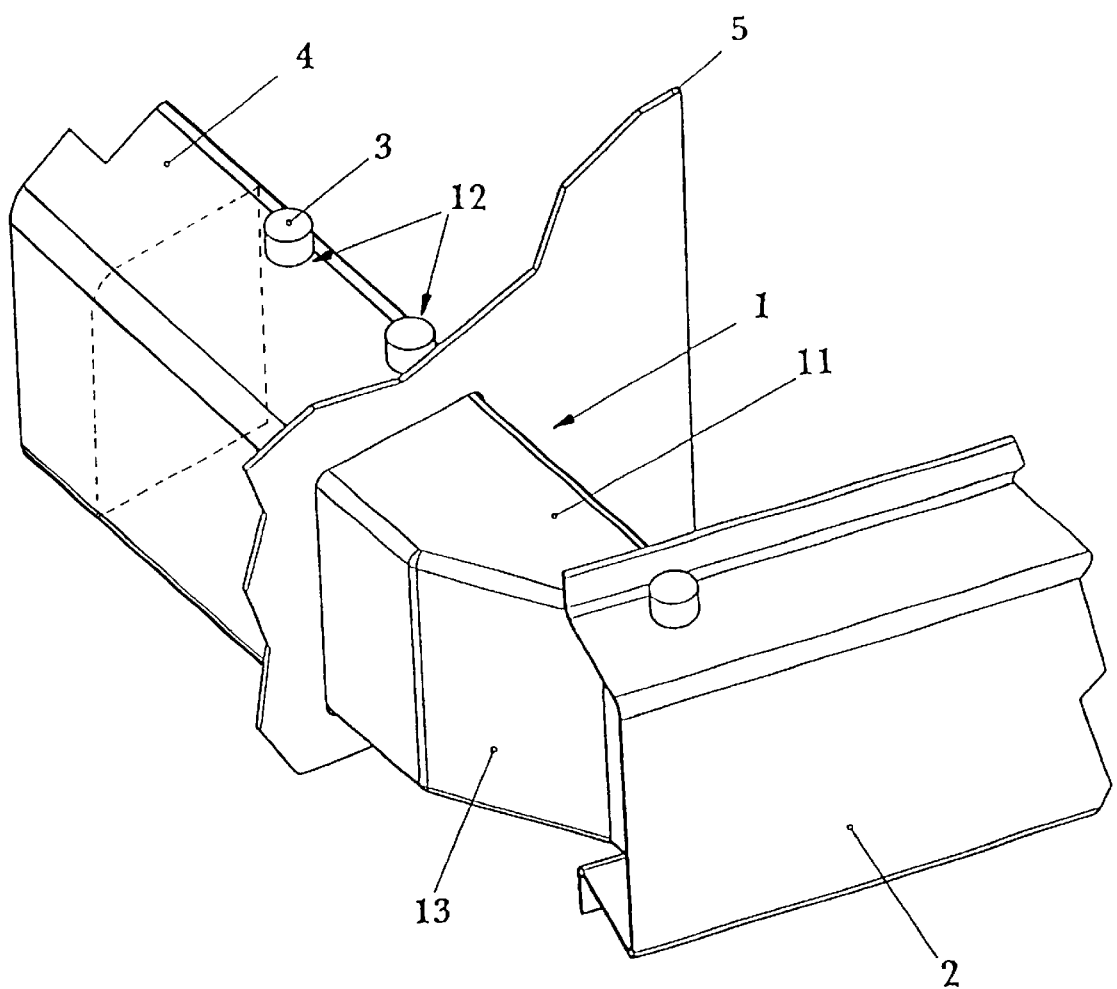
FIG. 1 shows schematically in a perspective partial view the assembled energy absorbing device.

FIG. 1 illustrates in a perspective fragmentary view a preferred embodiment of the energy absorbing device usable according to the present invention. An attachment bracket 1 shown as a close (chamber) shape of substantially rectangular cross-section comprises two substantially parallel and flat energy absorbing walls 11 connected by a pair of side walls 13 extending between the energy absorbing walls 11 so as to define a closed chamber of a bracket shape, preferably extruded in a suitable Al-alloy. The attachment bracket is partly accommodated inside a typical side member 4 of a car frame.

The front part or the rear part, depending on the orientation/localization of the bracket 1, is further re-shaped into a suitable functional configuration ensuring a simplified sturdy attachment bracket 1 that can be fastened to the cross-wise extending bumper beam 2. The side member 4 itself is integrated by any conventionally applied means into the frame/car body structure 5.

Figure 2:
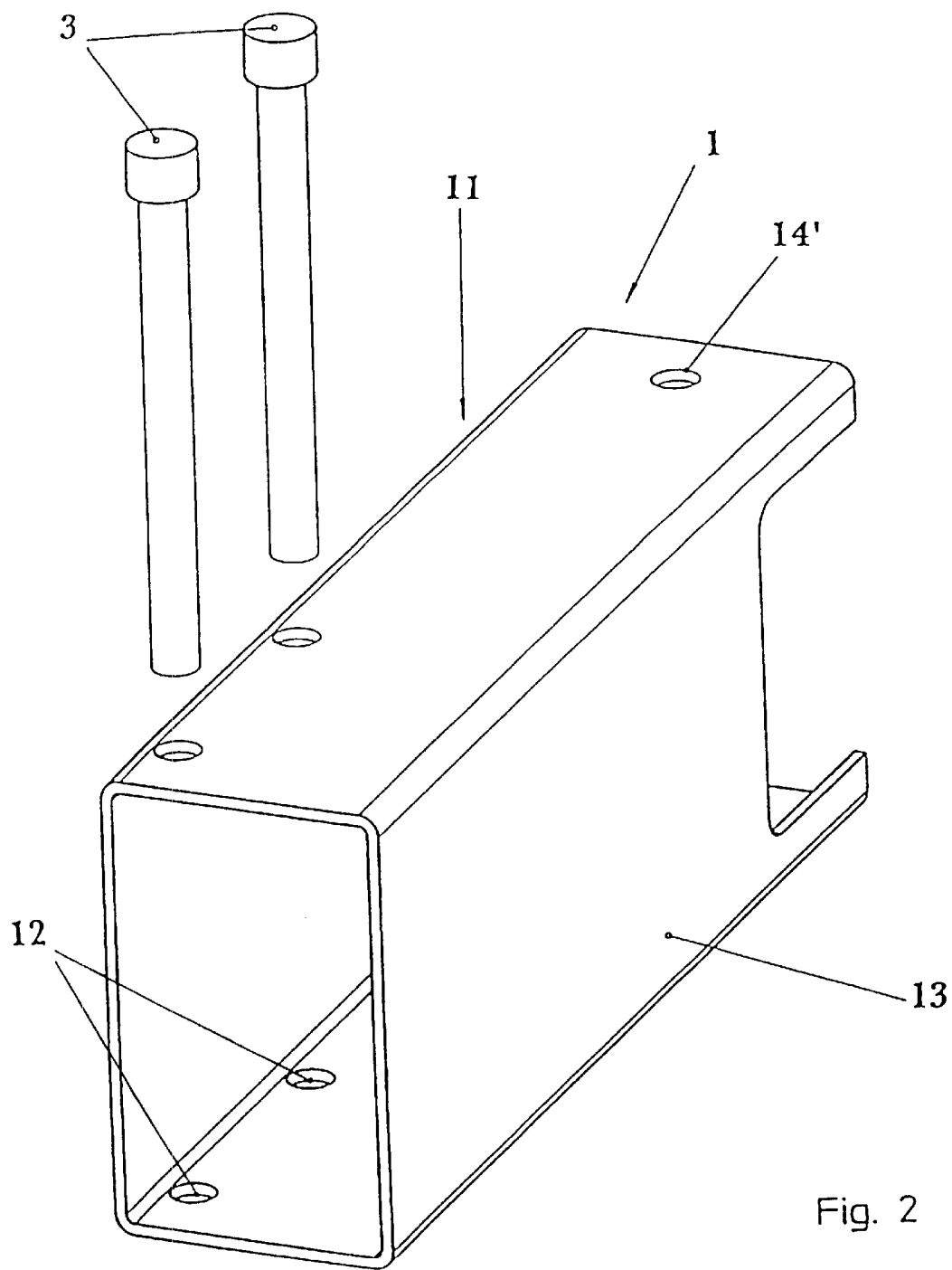
FIG. 2 is a perspective schematic view of the fastening energy absorbing device prior to assembling.

FIG. 2 shows schematically a detailed embodiment of the attachment bracket 1 comprising the energy absorbing walls 11 and the pair of perpendicularly extending side walls 13 which define the closed chamber of the bracket 1.

Each of the energy absorbing walls 11 are provided with apertures 12 to accommodate a pair of bolts 3 extending vertically through the apertures located in the respective parallel walls 11. Still another pair of apertures 14' are located at the front end of the bracket body which includes another special/possible configuration shaped as a fork to simplify connection/attachment to the bumper beam 2 (not shown in the Figure) by partially removing/cutting a portion of each of the connection side walls 13.

Figure 3:
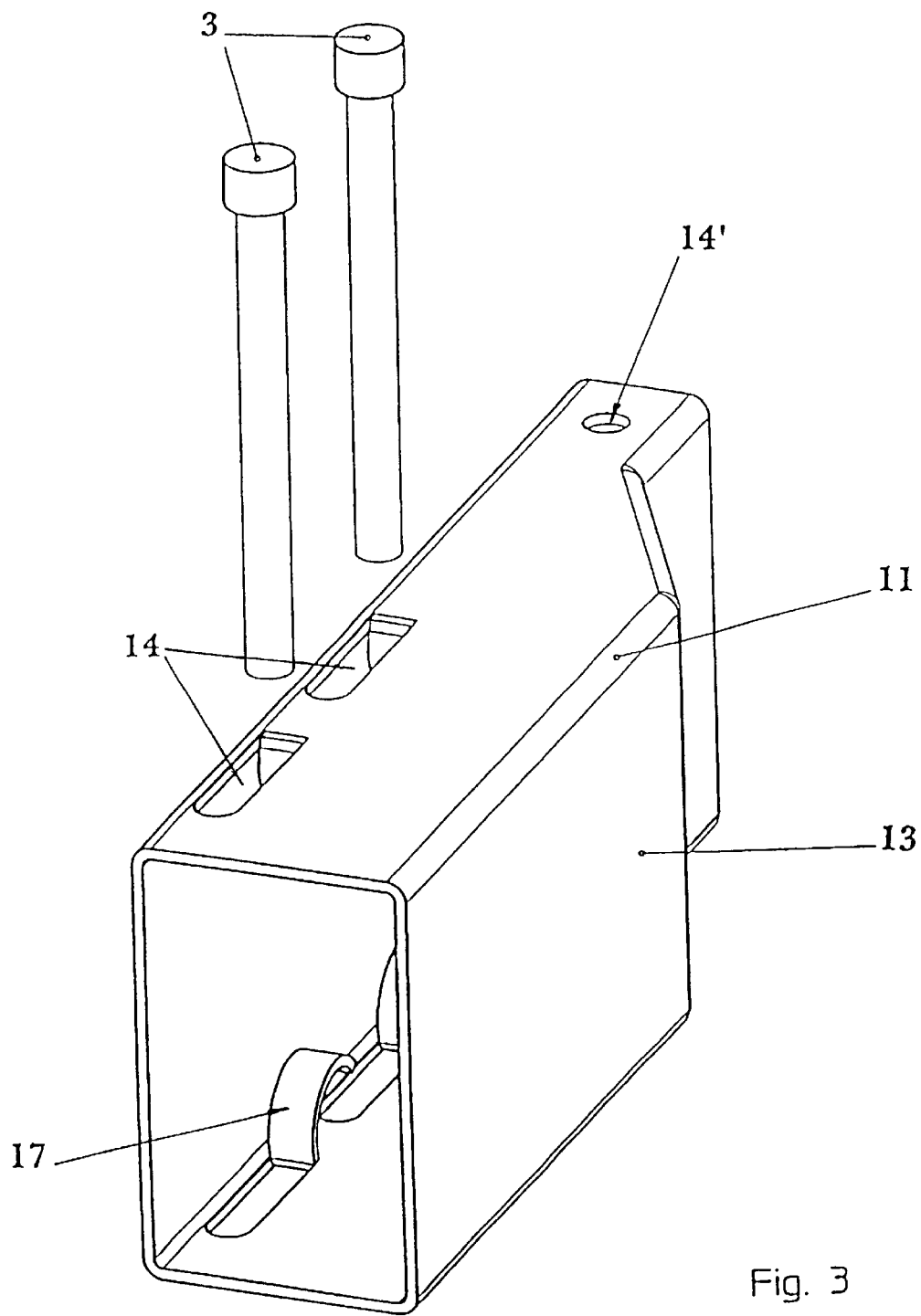
FIG. 3 shows the fastening energy absorbing means from FIG. 2 after absorption of a moderate amount of impact energy.

FIG. 3 illustrates changes in the energy absorbing walls 11 in the attachment bracket 1 from FIG. 2 due to impact. As apparent from the Figure, the originally circular apertures 12, after being affected by the impact load transferred from the bumper beam (not shown in the Figure) into the bracket 1 by the fastening/shearing bolts 3, are transformed into elongated apertures 14 by shearing of the wall material. This shearing results in stripes 17 being carved from wall material and successively nested/disposed longitudinally along the connecting (vertical) side walls 13. A corresponding transfer of load with similar change in the shape/configuration of the aperture(s) could occur with the front aperture 14'—depending on the dimensions and the total design of the attachment front part of the bracket.

Figure 4:
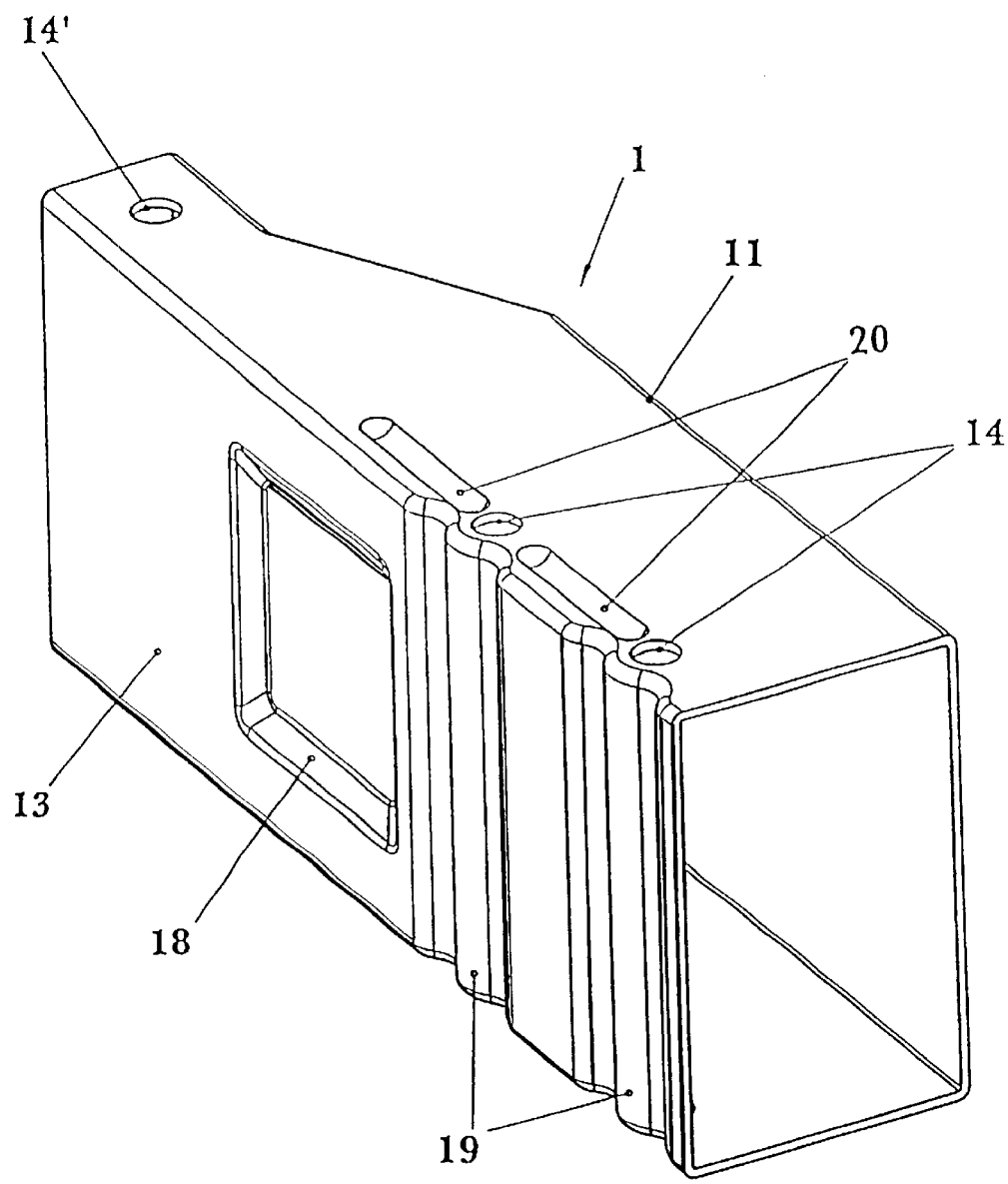
FIG. 4 is a schematic perspective illustration of a preferred embodiment/design of the energy absorbing device according to the present invention.

A preferred/optimal configuration of the attachment bracket 1 according to the present invention is illustrated in FIG. 4. Several design/constructional adaptions are provided in one of the vertical/connecting walls 13, and particularly the wall adjacent to the apertures 14 which accommodate the combined fastening/shearing bolts (not shown in the Figure). As seen from the Figure, three kinds of indentations 18, 19 and 20 are stamped into at least one extruded wall 13 of the bracket, and these indentations have different and beneficiary effects on the controlled energy absorption.

First of all, reshaping the wall 13 in the vicinity of the apertures 14 into a wavelike configuration (rills) 19 ensures that a larger portion of the wall 13 is encompassing/supporting the not shown fastening bolts 3, thus releasing the axial load of the bolts.

The second indentation shown as a substantially rectangular recession 18 in the side wall 13 serves primarily as a guiding means for the wall material against the nearest bolt during the shearing action.

The third indentations 20 are channel-like, and define the path to be sheared by the bolts. These indentations act as guiding means for the bolts during the shearing action, and also guide the sheared material stripes to the inside of the bracket wall.

The present invention is not limited to the above examples described by way of practical embodiments of the energy absorbing device. The actual bolts can, apart from the shown circular cross-section, also have, for example, an oval or rectangular shape (configuration) without departing from the spirit of the present invention. However, it is important that the bolt has a configuration (geometry) that ensures shearing of material and not just a simple cutting that results in substantially less energy absorption.

Furthermore, the above described use of Al-alloy extruded hollow shapes providing a base member for manufacturing of the fastening brackets is just a weight/cost optimal solution. Other material, e.g. steel, and manufacturing/shaping techniques can be used within the scope of the present invention.

The mutual orientation of the energy absorbing and (vertical) connecting walls of the fastening bracket, respectively, can be adapted to the actual needs/space demands so that the energy absorbing walls can extend vertically or in any other angle.

What is claimed is:

1. An energy absorbing device for absorbing impact energy in a vehicle, comprising:
    an attachment bracket for connecting a bumper member to a vehicle frame member, said attachment bracket having at least two energy absorbing walls extending in a longitudinal direction of said attachment bracket, each of said energy absorbing walls having at least one aperture; and
    at least one bolt extending through said at least one aperture in each of said energy absorbing walls such that said at least one bolt shears said energy absorbing walls along predetermined lines when the bumper member of the vehicle is impacted.

2. The energy absorbing device of claim 1, wherein each of said at least two energy absorbing walls is substantially flat, and said at least two energy absorbing walls are parallel.

3. The energy absorbing device of claim 1, wherein said attachment bracket has a pair of side walls connecting each of said at least two energy absorbing walls so as to form a closed chamber, at least one of said pair of side walls having a guiding indentation for guiding said at least one bolt when said at least one bolt shears said energy absorbing walls.

4. The energy absorbing device of claim 3, wherein said closed chamber has a rectangular shape.

5. The energy absorbing device of claim 3, wherein said energy absorbing walls have guiding indentations for guiding said at least one bolt when said at least one bolt shears said energy absorbing walls, and for ensuring that sheared material from said energy absorbing walls is directed inside said attachment bracket.

6. The energy absorbing device of claim 3, wherein each of said at least one aperture in each of said energy absorbing walls is located adjacent to one of said pair of side walls such that said pair of side walls are operable to act as a guide for said at least one bolt.

7. The energy absorbing device of claim 6, wherein said attachment bracket has a first end to be connected to the bumper member, said first end having a shaped cross-sectional configuration.

8. The energy absorbing device of claim 6, wherein said energy absorbing walls have guiding indentations for guiding said at least one bolt when said at least one bolt shears said energy absorbing walls, and for ensuring that sheared material from said energy absorbing walls is directed inside said attachment bracket.

9. The energy absorbing device of claim 6, wherein at least one of said side walls of said attachment bracket has at least one indentation extending a height of said at least one of said side walls in a longitudinal direction of said at least one bolt so as to increase an area of said at least one of said side walls adjacent to said at least one bolt.

10. The energy absorbing device of claim 9, wherein said energy absorbing walls have guiding indentations for guiding said at least one bolt when said at least one bolt shears said energy absorbing walls, and for ensuring that sheared material from said energy absorbing walls is directed inside said attachment bracket.

11. The energy absorbing device of claim 3, wherein at least one of said side walls of said attachment bracket has at least one indentation extending a height of said at least one of said side walls in a longitudinal direction of said at least one bolt so as to increase an area of said at least one of said side walls adjacent to said at least one bolt.

12. The energy absorbing device of claim 11, wherein said energy absorbing walls have guiding indentations for guiding said at least one bolt when said at least one bolt shears said energy absorbing walls, and for ensuring that sheared material from said energy absorbing walls is directed inside said attachment bracket.

13. The energy absorbing device of claim 3, wherein said attachment bracket has a first end to be connected to the bumper member, said first end having a shaped cross-sectional configuration.

14. The energy absorbing device of claim 1, wherein said attachment bracket has a pair of side walls connecting each of said at least two energy absorbing walls, each of said at least one aperture in each of said energy absorbing walls being located adjacent to one of said pair of side walls such that said pair of side walls are operable to act as a guide for said at least one bolt.

15. The energy absorbing device of claim 14, wherein at least one of said side walls of said attachment bracket has at least one indentation extending a height of said at least one of said side walls in a longitudinal direction of said at least one bolt so as to increase an area of said at least one of said side walls adjacent to said at least one bolt.

16. The energy absorbing device of claim 15, wherein said energy absorbing walls have guiding indentations for guiding said at least one bolt when said at least one bolt shears said energy absorbing walls, and for ensuring that sheared material from said energy absorbing walls is directed inside said attachment bracket.

17. The energy absorbing device of claim 14, wherein said energy absorbing walls have guiding indentations for guiding said at least one bolt when said at least one bolt shears said energy absorbing walls, and for ensuring that sheared material from said energy absorbing walls is directed inside said attachment bracket.

18. The energy absorbing device of claim 14, wherein said attachment bracket has a first end to be connected to the bumper member, said first end having a shaped cross-sectional configuration.

19. The energy absorbing device of claim 1, wherein said attachment bracket has a pair of side walls connecting each of said at least two energy absorbing walls, at least one of said side walls of said attachment bracket having at least one indentation extending a height of said at least one of said side walls in a longitudinal direction of said at least one bolt so as to increase an area of said at least one of said side walls adjacent to said at least one bolt.

20. The energy absorbing device of claim 19, wherein said energy absorbing walls have guiding indentations for guiding said at least one bolt when said at least one bolt shears said energy absorbing walls, and for ensuring that sheared material from said energy absorbing walls is directed inside said attachment bracket.

21. The energy absorbing device of claim 19, wherein said attachment bracket has a first end to be connected to the bumper member, said first end having a shaped cross-sectional configuration.

22. The energy absorbing device of claim 1, wherein said attachment bracket has a first end to be connected to the bumper member, said first end having a shaped cross-sectional configuration.

* * * * *